Figure 13:
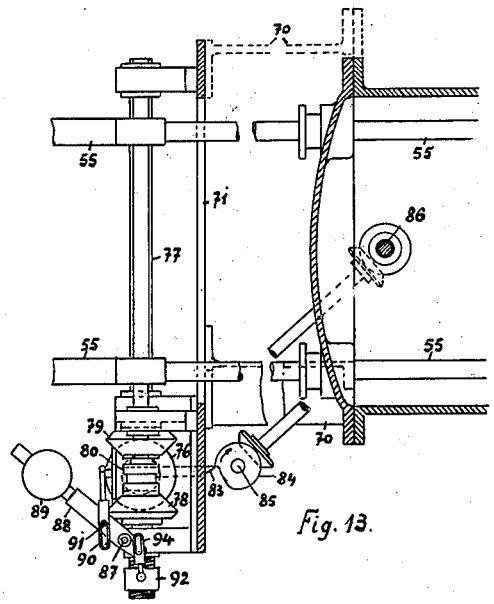

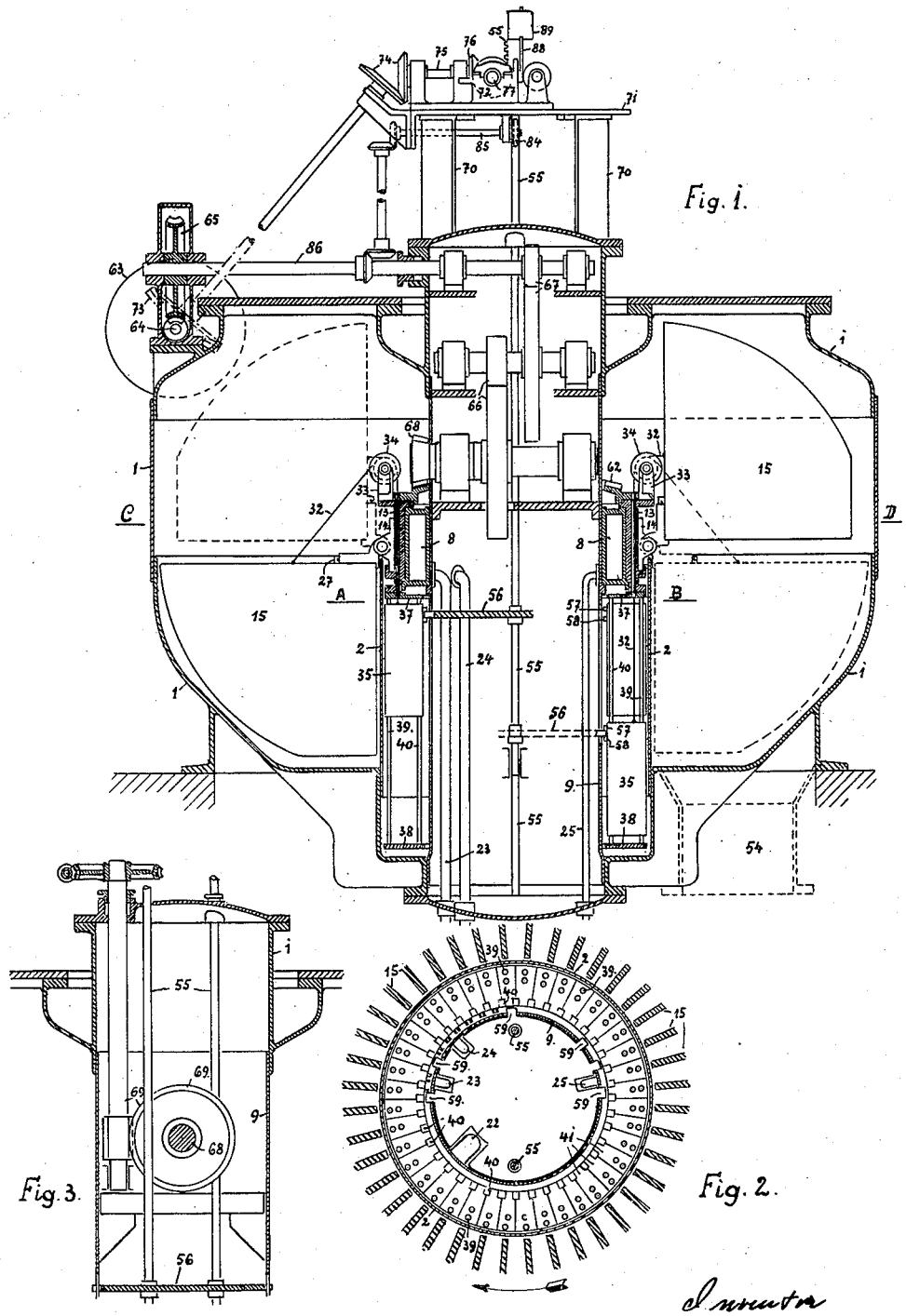

April 14, 1936.  F. JAEGER  2,037,134
FILTER
Filed May 5, 1934  4 Sheets-Sheet 2
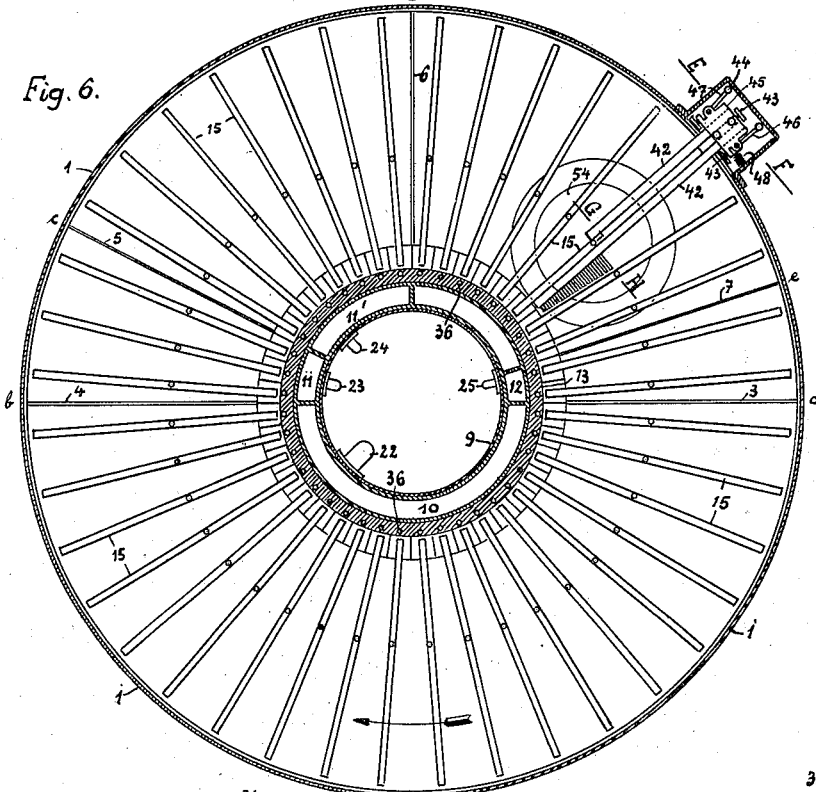
Fig. 6.
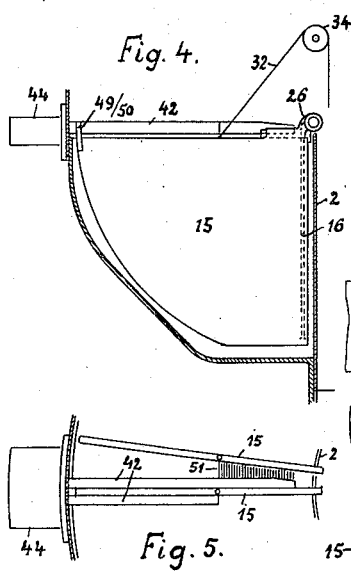
Fig. 4.
Fig. 5.
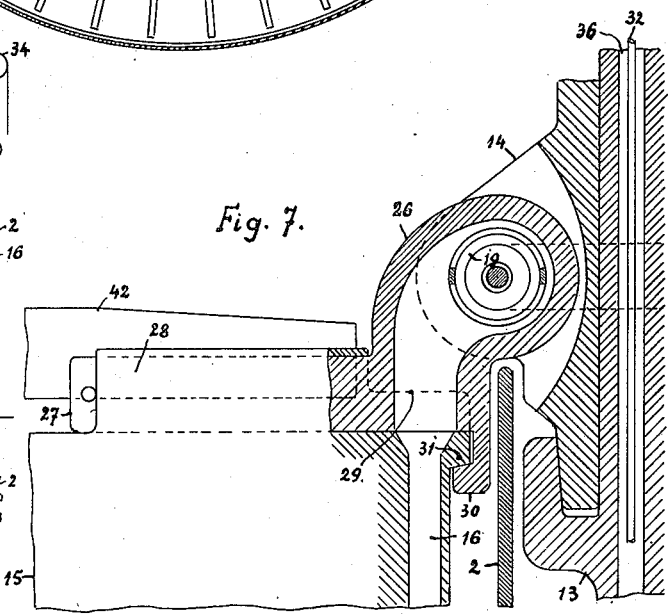
Fig. 7.

April 14, 1936.  F. JAEGER  2,037,134
FILTER
Filed May 5, 1934  4 Sheets-Sheet 3
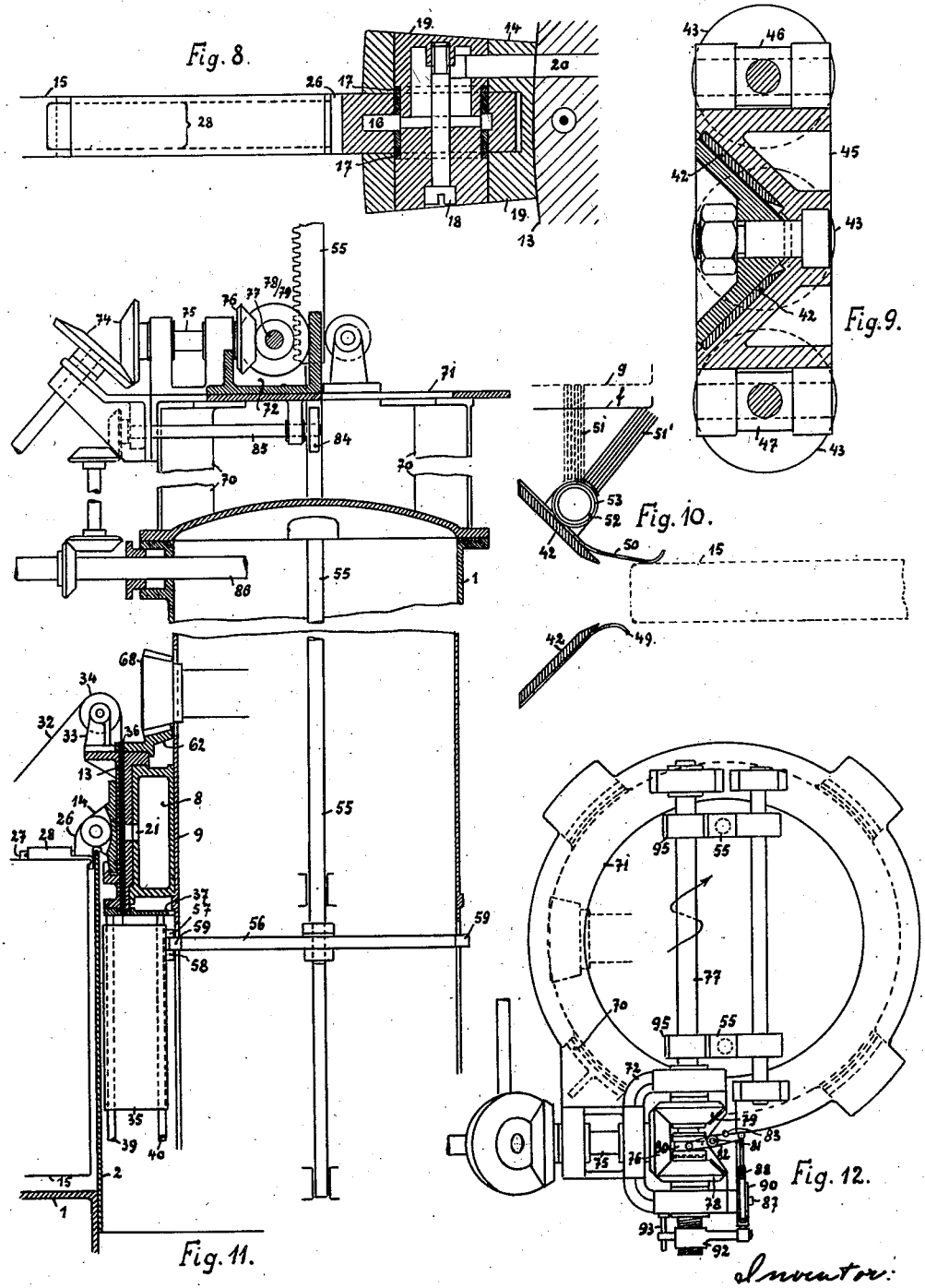

April 14, 1936.  F. JAEGER  2,037,134

FILTER

Filed May 5, 1934   4 Sheets-Sheet 4

Inventor
Fritz Jaeger
By H. F. Ohrendorth
Atty

Patented Apr. 14, 1936

2,037,134

UNITED STATES PATENT OFFICE 2,037,134

FILTER

Fritz Jaeger, Halle/Salle, Germany

Application May 5, 1934, Serial No. 724,180
In Germany September 19, 1932

15 Claims. (Cl. 210—200)

This invention relates to pressure filters for liquids, and more particularly to filters of this kind having a pressure-tank with radially directed plate-shaped filter elements that may be rotated about a vertical axis and a control-apparatus positioned centrally within said tank.

Similar filters operating by action of suction are known in which filters the filtering elements are united into groups suspended freely or from ropes or chains by means of vertical guides, said filtering elements being lifted by means of pressure-air or a curved cam-path or guide-track over partitions dividing the trough with the liquid therein into a plurality of compartments. The filtered liquid and the washing liquid are carried away by means of hoses. Such packets of plate-shaped filtering elements naturally occupy a great space within the compartments of the trough so that for the filtering process proper only a relatively short path will remain through which the immersed packet of filter-plates may be moved, especially if the lifting of the plates over the aforementioned partitions is effected by means of cams or tracks having relatively long curvatures, the advantage of attaining a large effective filtering surface by employing a great number of packets of filter-plates being thus entirely absent. The proposed construction of suction-filters having only a single packet of filter-plates is connected with the disadvantage of presenting a smaller filtering surface and in consequence thereof the working capacity of the filter is considerably reduced. Uniting the filter-plates into packets, furthermore, will render it difficult to remove the precipitate or so-called cake from the filter-plates. Removal of the precipitate in this case can only be accomplished in an imperfect way and to a limited extent, and in addition to this, the several filter-plates can only be inserted and taken out with difficulty.

In contra-distinction to these known suction-filters, the filter which forms part of my present invention is constructed as a pressure-filter having filter-plates positioned in close proximity to each other and mounted swingably in vertical planes about horizontal pivots and rotatably in a circular path about a vertical axis, and a centrally positioned control-apparatus, said filter-plates being connected by means of a special novel construction of joints with that part of said control-apparatus which serves to regulate the discharge of the filtered liquid and of the washing water without necessitating tubes or hoses for this purpose.

In order to lift the filtering plates over the partitions between the working spaces of the filter-tank and in order to remove the precipitate from said plates by means of knives, the several groups of filter-plates are swung upward through an angle of about 90° simultaneously at all places where such lifting is desired, as well as at the place where the precipitate is removed from the plates, motion of said plates being effected in every case by vertical downward and upward motion of a lifting disk which is operated by a control-mechanism positively connected with the filter-plates and positioned outside of the filter-casing.

Figure 14:
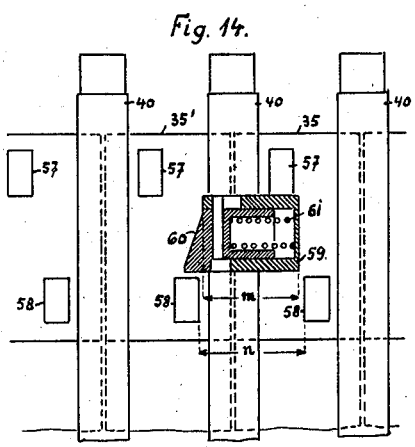
Figure 15:
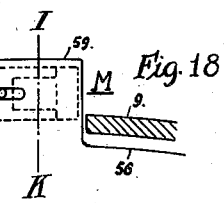
Figure 18:
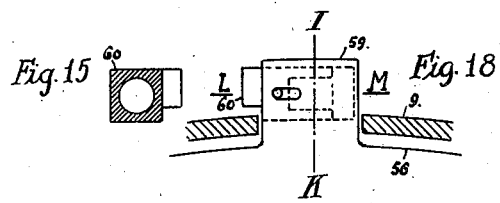

An example of a construction of my new pressure-filter is represented in the accompanying drawings which form part of this specification. In the drawings, Fig. 1 is a vertical section through the filter, Fig. 2 a horizontal section through Fig. 1 along line A—B thereof, Fig. 3 a view, partly in section, of a modified form of the mechanism for transmitting motion to the filter-plates, Fig. 4 a view of the device for removing the precipitate from said plates, Fig. 5 a plan-view of the device shown in Fig. 4, Fig. 6 a horizontal section through Fig. 1 along line C—D, Fig. 7 an enlarged view, partly in section, of the connection between the swingable filter-plates and that part of the control-mechanism for the filter-plate, Fig. 8 a plan-view taken on Fig. 7, Fig. 9 an enlarged section through Fig. 6 along line E—F, Fig. 10 an enlarged section through Fig. 6 along line G—H, Fig. 11 an enlarged vertical section through the control-mechanism for the filter-plates, Fig. 12 a plan-view on Fig. 11, Fig. 13 a side-view of said control-mechanism as seen from the right in Fig. 12, Fig. 14 an enlarged view, partly in section along line L—M, Fig. 18, of a catching means provided on said lifting disk for engagement between the latter and counterpoises, Fig. 15 a section along line I—K, Fig. 18, Fig. 16 a diagram indicating the motion of the filter-plates, Fig. 17 a detail of the control-mechanism which serves to impart motion to the filter-plates, and Fig. 18 a plan-view of a part of the device shown in Fig. 14.

Referring now more particularly to the drawings, my new pressure-filter consists essentially in the first place of a circular pressure-casing 1, closed all around, an interior wall 2 concentrical with respect to said casing, and radially directed walls or partitions 3, 4, 5, 6 and 7 as shown in Fig. 6, said walls or partitions subdividing the casing 1 into a working compartment a—b for the filtering proper, into another compartment b—c for the preliminary washing, into a third compartment c—d for final washing, and into a fourth and fifth compartment d—e and e—a for the drying of the precipitates, for removing the latter from the filter-plates, for blowing out and washing said plates, and in the second place of the circular control-mechanism 8 fixed to a tube 9 arranged centrally within said casing 1, said tube passing in larger constructions of the filter throughout said casing from its bottom to its top to increase the mechanical strength thereof and extending, in case of smaller filter constructions, only as far as shortly above the control-mechanism 8, thus dispensing with the necessity of a two-part construction of control mechanism.

The fixed part of said control-mechanism 8 is subdivided similarly to the casing 1 by partitions into a number of spaces 10, 11, 11' and 12, the space 10 serving for the reception of the liquid to be filtered, the spaces 11 and 11' for lixiviation, and the space 12 for supplying washing water for the filter-plates. Said fixed part of said control-mechanism is surrounded liquid-tight by a rotatable annular body 13. Immediately to the annular body 13 are fastened the quadrant-shaped filter-plates 15 by means of special joints 14 to permit swinging of said plates round one corner thereof, the point of rotation of said filter-plates being positioned outside of their straight border-lines, that is outside of the vertical inner and the horizontal upper edge of the plates in immersed position, so that the space intermediate said plates in raised position of the latter may be completely emptied. This emptying is effected by causing the liquid to flow from the channel 16 in the filter-plate 15, Fig. 8 through the hollow two-part pivot 19 of the joint-member 14 and the channel 20 in the annular body 13, as well as through the channels 21, Fig. 11, provided in the outer wall of the control-mechanism 8 into the chambers within the latter. The pivot 19 is tightened by packings 17 and kept together by means of the screw-bolt 18. From the chambers of the control-mechanism 8 the liquid is always discharged separately through the pipes 22, 23, 24 and 25 shown in Figs. 1 and 2. The channels 21 of course are carried to such an extent round the wall of said control-mechanism 8 as is required for carrying out the respective working process; for instance, for filtering the channel 21 is open from that point on at which the filter-plate is lowered into the liquid as far as to that point at which the filter-plate is lifted over a partition. The filter-plates may be divided in order to facilitate their being inserted into and taken out of the filtering space. The filter-plates may be divided for this purpose in such a way that the member 26 which carries the pivot 19 is separated from the plate 15 and equipped with a prismatic pivot 22 which is inserted into a similarly formed aperture 28 in said plate 15. Lateral rims 29 extending from said aperture 28 in the plate 15 prevent displacement of the two parts to be connected with each other within the plane of division which is perpendicular to the plane of the filter-plates, while a lifting of the member 26 from the filter-plate 15 in perpendicular direction to the connecting plane is prevented by the nose 30 which engages from underneath with the projection 31 (Fig. 7).

The filter-plates 15 are kept in working position by means of ropes 32 carried round rollers 34, mounted in bearings 33, towards the weights or counterpoises 35. These weights or counterpoises 35 are so dimensioned that they will only in part counteract the gravity of the filter-plates, irrespective of the fact whether the latter are weighted by precipitate or not. The ropes 32 are carried through bores 36, Fig. 11, provided in the annular body 13. The exact working position of the filter-plates is determined by the length of said ropes which may easily be adjusted by means of an adjusting screw provided for each rope.

The several counterpoises 35 are united into an aggregate by means of a circular upper ring 37 which is fast on the annular body 13 and a similar formed under ring 38, said two rings being kept together by outer and inner guide-bars 39 and 40. Said aggregate of counterpoises is thus positioned immediately underneath the control-mechanism 8 and intermediate the interior wall 2 of the pressure-casing 1 and the wall of the tube 9. The counterpoises 35 are mounted to permit upward and downward-sliding for imparting swinging motion to the filter-plates 15 about their pivots 19, whenever said counterpoises are acted upon by proper forces. More particularly, downward motion of a counterpoise 35 will effect lifting and upward motion of a counterpoise will effect lowering of the appertaining filter-plate. The angle through which the plates are rotated depends upon the conformation of the latter, the angle of rotation amounting to 90°, if the plate is of the form of a quadrant, as will ordinarily be the case.

The swinging motion of the filter-plates serves besides for removing the precipitates adhering thereto, by passing said plates in upward direction through two horizontally positioned and radially directed knives 42, Figs. 4, 5, 6, and 9, or between similarly positioned brushes. Said knives, in agreement with the circularly moving filter-plates, are equipped with a contrivance permitting them to be carried with said filter-plates, at the same time maintaining their radial position. For this purpose the knives are kept within a holder, mounted easily movably and with some play on rollers between the lateral walls of the casing 44, said holder being swingably fastened to the guide-rods 46 and 47 which are maintained in non-parallel position to each other. With a proper position of said guide-rods it is attained that with a tangential displacement of the holder 45 there is always maintained the radial position of said knives. A spring 48 carries said holder together with said knives into initial position, as soon as the filter-plate is released from the knives. Placing the filter-plate between the knives is facilitated by two guide-ledges 49 and 50, Figs. 9 and 10, said guide-ledges gripping the filter-plate at the rounded edge thereof. In the present case there is only a single pair of knives and one of the two knives 42 is cut-off at its inner side and extends as far as to the conical surface within which the obliquely guided ropes 32 move upon rotation of the filter-plates to permit circular motion of the suspension ropes for said plates. The cut-off knife-part is replaced by a brush 51 carried on the back of the longer knife, said brush serving to remove the residual precipitate which may still adhere to the plates during being again lowered. Each of the plates during being lifted moves through said pair of knives as may be seen from Fig. 4, and the plate is at first brought underneath the two knives and thereupon moved upward through said knives, continuously maintaining its circular motion. The two knives, accordingly, are carried with said plate, to permit such motion, the outer ends of the two knives being mounted in a bearing movable on rollers 43. As soon as the plate comes out of the range of action of said two knives, the latter by reason of their being resiliently mounted now return into initial position to receive the following plate. During downward motion of the plate the brush 51 now works on the rear surface of said plate, as may be seen from Fig. 5. In order to provide a compensation for increase of the distance between the rotating filter-plate and the fixed knife, the brush is fastened to a rotatable hollow cylinder kept under the action of a torsion-spring 52, said cylinder tending to keep the brush in horizontal position. Whenever the filter-plate 15 arrives in the position $f$, Fig. 10, the brush 51 is pressed against the action of the spring into position 51', will more and more come into erected position with increasing distance from the filter-plate and remain in contact with the latter as far as to the greatest distance from said plate, as indicated at $g$, so that residual precipitate may be removed from the plate.

The precipitate removed from the filter-plate is carried through a pipe-connection 54 into a container which is under pressure of the filtering space; this container is emptied from time to time.

Transmission of motion to the filter-plates to which at the same time a swinging motion must be given is effected in the example of construction shown in the drawings at five places at which the plates are lifted and at one place at which the precipitate is removed by means of a single upwardly and downwardly movable lifting disk 56 which is fastened to racks 55, said lifting disk having stops 59 as shown in Figs. 2 and 11, said stops engaging with the upper and under projections 57 and 58 on the respective counterpoises 35 for displacing the latter and simultaneously therewith imparting swinging motion to as many filter-plates as there are such stops. The width $m$ of the stops 59, Fig. 14, must be somewhat smaller than the distance $n$ between the projections 58 of two neighboring counterpoises 35; since the reversal of the lifting disk from its uppermost position takes place without interruption, the stops 59 are provided with displaceable bolts 60 which are kept under the action of a spring 61 and serve to reach, upon reversal of the upward motion of the lifting disk, the otherwise not available point of action of the latter by means of the projection on the neighboring counterpoise 35 which must now be lowered. The bolt 60 which is pressed inward by the projection 58 on the neighboring counterpoise 35' upon upward motion of the lifting disk shortly before arriving at its uppermost position, is now thrown forward as soon as said lifting disk comes into the uppermost position and engages with the projection 58 on the counterpoise 35' so that said projection will be carried with said bolt and the counterpoise moved downward.

The control-mechanism outside of the filter-casing serving for the regulation of the lifting disk is positively geared with the driving mechanism for the filter-plate and works likewise positively in itself. Said control mechanism is equipped with an engaging and disengaging device which moreover effects regulation of the proper sequence of the several working phases on the several filter-plates which are simultaneously operated.

Figure 17:
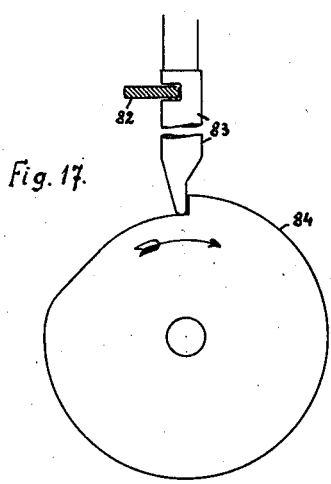

Fixed to the cylindrical annular body 13 is the toothed rim 62 which is rotated by the pulley 63 indicated in Fig. 1 in a dotted circular line as being fast on the shaft 64 of a worm-wheel 65 by way of the pairs of gear-wheels 67 and 66 and the bevelled pinion 68. Instead of the pairs of gear-wheels 66 and 67 there may also be used a worm-gear drive 69 as indicated in Fig. 3. A platform 71 is mounted on the casing 1 by means of standards 70, said platform serving for the reception of a control-device of the form of a reversing gear 72, which in the example shown is driven by the worm-shaft 64 by way of the pairs of bevel-gears 73 and 74. 75 is the driving shaft of the reversing gear 72, the bevel-wheel 76 being keyed to said shaft 75, while the driven shaft 77 carries loose thereon the bevel-wheels 78 and 79, Figs. 12 and 13, said bevel-wheels being equipped with coupling teeth. The bevel-wheels 78 and 79 are coupled with the driven shaft by means of a double-sided tooth-clutch 80 mounted displaceable on a key, said clutch 80 being moved by an operating lever 82 swingable about the pivot 81 against the one or the other of the bevel-wheels 78 and 79, thus effecting a change in the direction of rotation of the driven shaft. If the clutch 80, however, is positioned midway between the two bevel-wheels 78 and 79, with the two halves of the clutch disengaged from each other, no rotary motion will be transmitted to the driven shaft, that is the latter will be at standstill, even if the driving shaft rotates. Engagement of the clutch 80 is effected by a spring-actuated locking bolt 83 co-operating with a cam-disk 84 and provided with a slot at the height of the plane of swinging motion of the operating lever 82, said lever entering said slot after being rotated into the one of its end positions. (Fig. 17.) If, however, the locking bolt 83 is lifted out of engagement with the cam-disk 84, the operating lever can only be swung to such an extent that it will shift the clutch-member into position just midway the two gear-wheels 78 and 79, the driven shaft thus coming to standstill. The cam-shaft 85 which in the construction shown in the drawings is driven from the worm-shaft 86 will rotate at a speed $n_1 = Z.n$, if Z denotes the number of filter-plates and $n$ the speed of rotation of the filtering plates about the control-mechanism; that is to say, said shaft will rotate through exactly one revolution, if the filter-plates have rotated $$\frac{1}{Z}$$

times, or through an angle $$\frac{360°}{Z}$$

Every revolution of the cam-disk 84 determines the moment for again rotating the driven shaft which had previously been put to standstill, that is the moment for lowering the respective group of filter-plates; since the now following motion of the filter-plates takes place without any intermission, the cam-shaft 84 constitutes the mechanism which serves to control the swinging motion.

In accordance with the connection of the clutch 80 with the gear-wheel 79 or 78, the shaft 77 will rotate in the sense of the arrow shown round said shaft, or said shaft 77 will remain at standstill, if said clutch 80 does not contact with either of said gear-wheels. The change of the position of the clutch 80 relatively to the gear-wheels 78 and 79 is initiated by the nut 92 which causes the counterpoise on the lever 88 to move downward by action of gravity, thereby swinging the lever 82. The swing of said lever 82 is controlled by a locking-mechanism 85 comprising a ratchet-wheel 84 (Figs. 13 and 17). Said ratchet-wheel makes exactly one revolution, if the filter-plate moves from $h$ to $l$, Fig. 16. The point $h$ of the diagram is defined for each filter-plate by said ratchet-wheel 84 as may be seen from the diagrammatic representation.

The clutch-engaging lever 82 is connected to a double-armed lever 88 rotatable about the pivot 87 and provided with the counterpoise 89 by means of a slotted bar 90, the slot in said bar in connection with a pin 91 on the lever 89 serving as a guide for the latter. The slot in the bar 90 is so dimensioned that the weighted lever 88 during swinging symmetrically with respect to a plane perpendicular to the plane of the drawings from one end position into the other will disengage the clutch 80 from the gear-wheels 78 and 79. Throwing of the lever 88 is effected by means of a nut 92 on a threaded part of the driven shaft 77, said nut being prevented from rotating by the pin 93 (Fig. 12) and connected by a slotted bar 94 with the weighted lever 88. The thread of the nut 92 is of such an inclination that in the time during which the filter-plate is swung through an angle of 90° the lever 88 will be moved from its one end position into its other end position in the rear of the aforementioned perpendicular plane. The clutch 80, therefore, is engaged and disengaged by the free falling motion of the counterpoise 89 which is so heavy that it will safely overcome the resistances arising within the clutch. In position of rest of the driven shaft the lever 82 likewise is under the action of the counterpoise 89, or in other words, the clutch is again disengaged by action of said counterpoise 89.

Fixed to the driven shaft 77 are two gear-wheels 95 driving the racks 55, the size of said gear-wheels being properly chosen so that the displacement of the lifting disk 56 necessary to swing the filter-plates through 90° takes place within the proper time to carry out this swinging motion.

The aforedescribed filter now operates as follows:

Rotary motion of the driving pulley 63 is transmitted to the toothed rim 62 and the annular body 13 connected therewith by way of the worm-gear 64—65, the pairs of gear-wheels 67 and 66 or worm-gear 69 as well as the bevelled pinion 68, whereby rotary motion is imparted to the filter-plates 15 fixed swingably to said annular body. At the same time a certain part of the filter-plates, for instance five plates as shown in the drawings, will come in front of the partitions between the working spaces $a$—$b$, $b$—$c$, $c$—$d$, $d$—$e$, $e$—$a$ for being lifted over said partitions and freed from precipitate. The motions taking place in this case are represented in the diagram Fig. 16 in which the abscissæ represent the motion taking place along a circular part in horizontal direction, and the ordinates the vertical motion of the filter-plates. At the point $h$ in Fig. 16 the lifting disk 56 moves from above towards below, grips with the stops 59 thereon the projections 58 on the respective six counter-poises 35 pulling the latter downward, thus swinging the filter-plates into their uppermost position (point $i$). In their uppermost position the six filter-plates must remain until they have been rotated sufficiently far in horizontal direction (point $k$); the lifting disk 56 must consequently remain in its undermost position during this time, that is during motion from $i$ to $k$. At the point $k$ the lifting disk is again raised, the filter-plates thus coming into their undermost position (point $l$). It will be immediately clear, that the removal of the precipitate from the one of the filter-plates within the working space $d$—$e$ is effected by the double knife during swinging motion of the plate from $h$ to $i$, while the remainder of the precipitate which is not reached by the short knife is removed by the brush 51 during downward swinging from $k$ to $l$.

At the point $l$ the lifting disk 56 is immediately again lowered without any intermission, because there will be as many filter-plates in the place of those which had just been lifted above a partition. These plates are moved in exactly the same manner as before; point $l$ in the diagram Fig. 16 now corresponds to the point $h$. The swinging motions of an entire group of filter-plates are therefore due to every downward and upward motion of the lifting disk, said motions being repeated at exactly timed intervals in accordance with the rotating motion of the filter-plates. By so combining the individual motions always into a downward and upward motion of the lifting disk, the control of the parts moving within the closed pressure tank will be considerably facilitated.

Figure 16:
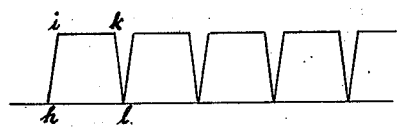

The control mechanism which regulates the motions of the lifting disk is constructed to be in exact agreement with the motions represented in the diagram Fig. 16, that is said mechanism effects at $h$ the lowering, at $i$ the standstill, and at $k$ the raising of the lifting disk, and since at $l$ the process repeats itself without intermission, the function of said control mechanism consists in constantly reversing the direction of rotation of the gear-wheels 95 which serve for driving the lifting disk and to put said gear-wheels to standstill once during each working step and subsequently again rotating said gear-wheels for carrying out the several steps of the process. Since the gear-wheels 95 are positively coupled with the control apparatus which is of the form of a reversing gear, and since said control apparatus is again coupled with the annular body 13, that is with the filter-plates, any wrong motions of the lifting disk are safely prevented. Besides, after each working step from $h$ to $l$ a positive regulation takes place with respect to the moment of the beginning of a new working step. At the point $h$ in the diagram Fig. 16 the weighted lever 88 will be in a position to impart to the driven shaft the direction of rotation for downward motion of the lifting disk, while at the point $i$ the reversal of rotation takes place at the driven shaft by throwing the weighted lever 88, which, however, does not fall into its end position but is retained by the locking bolt 83. Thus, the clutch 80 will solely be disengaged but not connected with its counter-part on the driven shaft 77, so that the latter and consequently also the lifting disk 56 is put to standstill in its undermost position. The driven shaft is again set into rotation not before the point $k$, the rotation being in this case in opposite direction, the locking bolt 83 by action of the cam-disk 84 releasing the operating lever 82, whereupon the latter by action of the counterpoise 89 on the lever 88 connects the clutch member 80 with its counter-part. The moment at which the locking bolt 83 is released by the cam-disk 84 is fixed by positive connection with the filter-plates and by the fact that said cam-disk is rotated exactly through one revolution on the way from $h$ to $l$. At the point $l$ the rotary mobeing mounted in a bearing movable on rollers 43. As soon as the plate comes out of the range of action of said two knives, the latter by reason of their being resiliently mounted now return into initial position to receive the following plate. During downward motion of the plate the brush 51 now works on the rear surface of said plate, as may be seen from Fig. 5. In order to provide a compensation for increase of the distance between the rotating filter-plate and the fixed knife, the brush is fastened to a rotatable hollow cylinder kept under the action of a torsion-spring 52, said cylinder tending to keep the brush in horizontal position. Whenever the filter-plate 15 arrives in the position $f$, Fig. 10, the brush 51 is pressed against the action of the spring into position 51', will more and more come into erected position with increasing distance from the filter-plate and remain in contact with the latter as far as to the greatest distance from said plate, as indicated at $g$, so that residual precipitate may be removed from the plate.

The precipitate removed from the filter-plate is carried through a pipe-connection 54 into a container which is under pressure of the filtering space; this container is emptied from time to time.

Transmission of motion to the filter-plates to which at the same time a swinging motion must be given is effected in the example of construction shown in the drawings at five places at which the plates are lifted and at one place at which the precipitate is removed by means of a single upwardly and downwardly movable lifting disk 56 which is fastened to racks 55, said lifting disk having stops 59 as shown in Figs. 2 and 11, said stops engaging with the upper and under projections 57 and 58 on the respective counterpoises 35 for displacing the latter and simultaneously therewith imparting swinging motion to as many filter-plates as there are such stops. The width $m$ of the stops 59, Fig. 14, must be somewhat smaller than the distance $n$ between the projections 58 of two neighboring counterpoises 35; since the reversal of the lifting disk from its uppermost position takes place without interruption, the stops 59 are provided with displaceable bolts 60 which are kept under the action of a spring 61 and serve to reach, upon reversal of the upward motion of the lifting disk, the otherwise not available point of action of the latter by means of the projection on the neighboring counterpoise 35 which must now be lowered. The bolt 60 which is pressed inward by the projection 58 on the neighboring counterpoise 35' upon upward motion of the lifting disk shortly before arriving at its uppermost position, is now thrown forward as soon as said lifting disk comes into the uppermost position and engages with the projection 58 on the counterpoise 35' so that said projection will be carried with said bolt and the counterpoise moved downward.

The control-mechanism outside of the filter-casing serving for the regulation of the lifting disk is positively geared with the driving mechanism for the filter-plate and works likewise positively in itself. Said control mechanism is equipped with an engaging and disengaging device which moreover effects regulation of the proper sequence of the several working phases on the several filter-plates which are simultaneously operated.

Fixed to the cylindrical annular body 13 is the toothed rim 62 which is rotated by the pulley 63 indicated in Fig. 1 in a dotted circular line as being fast on the shaft 64 of a worm-wheel 65 by way of the pairs of gear-wheels 67 and 66 and the bevelled pinion 68. Instead of the pairs of gear-wheels 66 and 67 there may also be used a worm-gear drive 69 as indicated in Fig. 3. A platform 71 is mounted on the casing 1 by means of standards 70, said platform serving for the reception of a control-device of the form of a reversing gear 72, which in the example shown is driven by the worm-shaft 64 by way of the pairs of bevel-gears 73 and 74. 75 is the driving shaft of the reversing gear 72, the bevel-wheel 76 being keyed to said shaft 75, while the driven shaft 77 carries loose thereon the bevel-wheels 78 and 79, Figs. 12 and 13, said bevel-wheels being equipped with coupling teeth. The bevel-wheels 78 and 79 are coupled with the driven shaft by means of a double-sided tooth-clutch 80 mounted displaceable on a key, said clutch 80 being moved by an operating lever 82 swingable about the pivot 81 against the one or the other of the bevel-wheels 78 and 79, thus effecting a change in the direction of rotation of the driven shaft. If the clutch 80, however, is positioned midway between the two bevel-wheels 78 and 79, with the two halves of the clutch disengaged from each other, no rotary motion will be transmitted to the driven shaft, that is the latter will be at standstill, even if the driving shaft rotates. Engagement of the clutch 80 is effected by a spring-actuated locking bolt 83 co-operating with a cam-disk 84 and provided with a slot at the height of the plane of swinging motion of the operating lever 82, said lever entering said slot after being rotated into the one of its end positions. (Fig. 17.) If, however, the locking bolt 83 is lifted out of engagement with the cam-disk 84, the operating lever can only be swung to such an extent that it will shift the clutch-member into position just midway the two gear-wheels 78 and 79, the driven shaft thus coming to standstill. The cam-shaft 85 which in the construction shown in the drawings is driven from the worm-shaft 86 will rotate at a speed $n_1 = Z.n$, if Z denotes the number of filter-plates and $n$ the speed of rotation of the filtering plates about the control-mechanism; that is to say, said shaft will rotate through exactly one revolution, if the filter-plates have rotated $$\frac{1}{Z}$$

times, or through an angle $$\frac{360°}{Z}$$

Every revolution of the cam-disk 84 determines the moment for again rotating the driven shaft which had previously been put to standstill, that is the moment for lowering the respective group of filter-plates; since the now following motion of the filter-plates takes place without any intermission, the cam-shaft 84 constitutes the mechanism which serves to control the swinging motion.

In accordance with the connection of the clutch 80 with the gear-wheel 79 or 78, the shaft 77 will rotate in the sense of the arrow shown round said shaft, or said shaft 77 will remain at standstill, if said clutch 80 does not contact with either of said gear-wheels. The change of the position of the clutch 80 relatively to the gear-wheels 78 and 79 is initiated by the nut 92 which causes the counterpoise on the lever 88 to move downward by action of gravity, thereby swinging the lever 82. The swing of said lever 82 is controlled by a locking-mechanism 85 comprising a ratchet-wheel 84 (Figs. 13 and 17). Said ratchet-wheel makes exactly one revolution, if the filter-plate moves from $h$ to $l$, Fig. 16. The point $h$ of the diagram is defined for each filter-plate by said ratchet-wheel 84 as may be seen from the diagrammatic representation.

The clutch-engaging lever 82 is connected to a double-armed lever 88 rotatable about the pivot 87 and provided with the counterpoise 89 by means of a slotted bar 90, the slot in said bar in connection with a pin 91 on the lever 89 serving as a guide for the latter. The slot in the bar 90 is so dimensioned that the weighted lever 88 during swinging symmetrically with respect to a plane perpendicular to the plane of the drawings from one end position into the other will disengage the clutch 80 from the gear-wheels 78 and 79. Throwing of the lever 88 is effected by means of a nut 92 on a threaded part of the driven shaft 77, said nut being prevented from rotating by the pin 93 (Fig. 12) and connected by a slotted bar 94 with the weighted lever 88. The thread of the nut 92 is of such an inclination that in the time during which the filter-plate is swung through an angle of 90° the lever 88 will be moved from its one end position into its other end position in the rear of the aforementioned perpendicular plane. The clutch 80, therefore, is engaged and disengaged by the free falling motion of the counterpoise 89 which is so heavy that it will safely overcome the resistances arising within the clutch. In position of rest of the driven shaft the lever 82 likewise is under the action of the counterpoise 89, or in other words, the clutch is again disengaged by action of said counterpoise 89.

Fixed to the driven shaft 77 are two gear-wheels 95 driving the racks 55, the size of said gear-wheels being properly chosen so that the displacement of the lifting disk 56 necessary to swing the filter-plates through 90° takes place within the proper time to carry out this swinging motion.

The aforedescribed filter now operates as follows:

Rotary motion of the driving pulley 63 is transmitted to the toothed rim 62 and the annular body 13 connected therewith by way of the worm-gear 64—65, the pairs of gear-wheels 67 and 66 or worm-gear 69 as well as the bevelled pinion 68, whereby rotary motion is imparted to the filter-plates 15 fixed swingably to said annular body. At the same time a certain part of the filter-plates, for instance five plates as shown in the drawings, will come in front of the partitions between the working spaces $a$—$b$, $b$—$c$, $c$—$d$, $d$—$e$, $e$—$a$ for being lifted over said partitions and freed from precipitate. The motions taking place in this case are represented in the diagram Fig. 16 in which the abscissae represent the motion taking place along a circular part in horizontal direction, and the ordinates the vertical motion of the filter-plates. At the point $h$ in Fig. 16 the lifting disk 56 moves from above towards below, grips with the stops 59 thereon the projections 58 on the respective six counter-poises 35 pulling the latter downward, thus swinging the filter-plates into their uppermost position (point $i$). In their uppermost position the six filter-plates must remain until they have been rotated sufficiently far in horizontal direction (point $k$); the lifting disk 56 must consequently remain in its undermost position during this time, that is during motion from $i$ to $k$. At the point $k$ the lifting disk is again raised, the filter-plates thus coming into their undermost position (point $l$). It will be immediately clear, that the removal of the precipitate from the one of the filter-plates within the working space $d$—$e$ is effected by the double knife during swinging motion of the plate from $h$ to $i$, while the remainder of the precipitate which is not reached by the short knife is removed by the brush 51 during downward swinging from $k$ to $l$.

At the point $l$ the lifting disk 56 is immediately again lowered without any intermission, because there will be as many filter-plates in the place of those which had just been lifted above a partition. These plates are moved in exactly the same manner as before; point $l$ in the diagram Fig. 16 now corresponds to the point $h$. The swinging motions of an entire group of filter-plates are therefore due to every downward and upward motion of the lifting disk, said motions being repeated at exactly timed intervals in accordance with the rotating motion of the filter-plates. By so combining the individual motions always into a downward and upward motion of the lifting disk, the control of the parts moving within the closed pressure tank will be considerably facilitated.

The control mechanism which regulates the motions of the lifting disk is constructed to be in exact agreement with the motions represented in the diagram Fig. 16, that is said mechanism effects at $h$ the lowering, at $i$ the standstill, and at $k$ the raising of the lifting disk, and since at $l$ the process repeats itself without intermission, the function of said control mechanism consists in constantly reversing the direction of rotation of the gear-wheels 95 which serve for driving the lifting disk and to put said gear-wheels to standstill once during each working step and subsequently again rotating said gear-wheels for carrying out the several steps of the process. Since the gear-wheels 95 are positively coupled with the control apparatus which is of the form of a reversing gear, and since said control apparatus is again coupled with the annular body 13, that is with the filter-plates, any wrong motions of the lifting disk are safely prevented. Besides, after each working step from $h$ to $l$ a positive regulation takes place with respect to the moment of the beginning of a new working step. At the point $h$ in the diagram Fig. 16 the weighted lever 88 will be in a position to impart to the driven shaft the direction of rotation for downward motion of the lifting disk, while at the point $i$ the reversal of rotation takes place at the driven shaft by throwing the weighted lever 88, which, however, does not fall into its end position but is retained by the locking bolt 83. Thus, the clutch 80 will solely be disengaged but not connected with its counter-part on the driven shaft 77, so that the latter and consequently also the lifting disk 56 is put to standstill in its undermost position. The driven shaft is again set into rotation not before the point $k$, the rotation being in this case in opposite direction, the locking bolt 83 by action of the cam-disk 84 releasing the operating lever 82, whereupon the latter by action of the counterpoise 89 on the lever 88 connects the clutch member 80 with its counter-part. The moment at which the locking bolt 83 is released by the cam-disk 84 is fixed by positive connection with the filter-plates and by the fact that said cam-disk is rotated exactly through one revolution on the way from $h$ to $l$. At the point $l$ the rotary motion is again reversed simply by throwing the lever 68 for the next working step. Instead of a control apparatus which operates by action of weight there may evidently also be used a control apparatus operating by action of spring-power. It is furthermore evident to equip the control mechanism with an electrical apparatus to bring about the motions indicated in Fig. 16 by action of contacts.

With respect to the number and size of the working spaces, my present filter may be constructed in various ways and it will likewise offer no difficulties whatever, to add one or more working steps as these are all alike, such addition involving no extra costs of constructions. It will further be possible to use, for instance, a fractional washing process for removing the precipitate from the filter-plates which may be in many cases desirable. Also a synthetic action between the material to be filtered and a further substance may be used with advantage.

Furthermore, an additional device for removing residual of precipitate may be used in conjunction with the aforementioned knives and brushes.

The possibility of making use of the aforementioned synthetic action is due to the specific novel construction of my present filter, which immediately permits employment of a greater number of working spaces, as had been mentioned above. More particularly, my present filter may be used for carrying out a synthetic process merely by subdividing one or more of the working spaces. When using the synthetic process the precipitate will undergo a change in a chemical respect by causing said precipitate to come in contact with one or more chemicals in the special working spaces provided for this purpose. By this it will be possible to obtain in the filter itself from the precipitate resulting from a chemical compound $x$ another substance $y$ which may be taken off the filter-plates. A synthetic process will thus offer quite new possibilities in the chemical industry, if, for instance, it is considered to treat substances which under the influence of thermo-physical compounds, such as in case of exposure to light or in case of being continuously kept in dry condition, are liable to decompose and which may be rapidly united with one or more other substances immediately in the filter and brought into a form of constant light-dryness and resistivity against temperature, the said substances being obtained in this form immediately at the filter.

In order to give an example, there may be, for instance, a precipitate $a$ which is explosive when exposed to light, and non-explosive if united with a substance $b$ with which it is turned into a compound in the dark filter space under a certain pressure, thus producing a new substance $c$. To produce this substance in a large scale by filtration would not be possible with any known filter, as known filters do not offer the possibility to turn said substance, for instance, into a form which is resistive against light.

As the drawings do not show the mode of supplying the liquid or the washing water to the filter, it may be noted that the liquid and washing water may, for instance, be supplied by means of pumps in such a way that the liquid in the spaces of the trough is automatically kept at constant level.

It is furthermore evident that the control mechanism described hereinabove in connection with filter-plates destined for use in a pressure filter may immediately be used in connection with suction filters.

I claim:

1. In a pressure-filter for continuous operation, the combination of a pressure-casing constructed at its under part as an annular liquid trough, with a plurality of filter-plates mounted circularly rotatable about a control-mechanism arranged centrally with respect to said casing, joints for supporting said filter-plates to permit additional swinging motion of the latter in radial planes through an angle of 90°, radially directed partitions within said trough dividing the latter into a plurality of working spaces and a collecting space, lifting and lowering means adapted to move said plates individually and in succession over said partitions from one into another of said working spaces and said collecting space, a device for removing the precipitate successively from said filter-plates during being lifted within said collecting space, and drainage means for the filtrate.

2. In a pressure-filter for continuous operation, the combination of a pressure-casing constructed at its under part as an annular liquid trough, with drainage means for the filtrate, a plurality of filter-plates positioned radially with respect to said trough and mounted circularly rotatable about a control-mechanism arranged centrally with respect to said casing, horizontally positioned joints for swingably supporting said filter-plates to permit additional swinging motion of the latter in radial planes through an angle of 90°, radially directed partitions within said trough dividing the latter into a plurality of working spaces and a collecting space, means for successively lifting and lowering said filter-plates individually during circular motion through said trough over said partitions from one into an adjacent working space and into said collecting space, and a device for removing the precipitate successively from said filter-plates during being lifted within said collecting space, said joints and filter-plates and said lifting and lowering means being operatively connected with said control-mechanism, said device being mounted on said casing and consisting of knives adapted to participate in said circular motion.

3. In a pressure-filter for continuous operation, the combination of a pressure-casing constructed at its under part as an annular liquid trough, with drainage means for the filtrate, a plurality of filter-plates positioned radially with respect to said casing and mounted circularly rotatable about a control-mechanism arranged centrally with respect to said casing, horizontally positioned joints for swingably supporting said filter-plates to permit swinging motion of the latter in radial planes through an angle of 90°, radially directed partitions within said trough, said partitions dividing the latter into a plurality of working spaces and a collecting space, a lifting disk for successively lifting and lowering said filter-plates during circular motion through said casing over said partitions from one into an adjacent working space and said collecting space, weights mounted movably within vertical guides and each fastened to one end of a rope laid round a roller, the other end of said rope being fastened to said filter-plates, so that said weights will act as counterpoises for said plates, stops on said lifting disk, said stops engaging with projections on said weights, and a device for removing the precipitate from said filter-plates during being lifted within said collecting space.

4. In a pressure-filter for continuous operation, the combination of a pressure-casing constructed at its under part as an annular liquid-trough, with drainage means for the filtrate, a plurality of filter-plates mounted circularly rotatable about a control-mechanism arranged centrally with respect to said casing, joints for supporting said filter-plates to permit additional swinging motion of the latter in radial planes through an angle of 90°, radially directed partitions within said trough dividing the latter into a plurality of working spaces and a collecting space, a lifting disk for successively lifting said filter-plates during circular motion through said casing over said partitions progressively from one into another of said spaces, means for transmitting motion from said lifting disk to said filter-plates, a device for removing the precipitate from said filter-plates during being lifted within said collecting space, a bevel-gear drive mounted outside of said pressure-casing and adapted to raise and lower said lifting disk, and a reversing gear interposed between said disk and said bevel-gear drive, said joints, said lifting disk, said bevel-gear drive and said reversing gear being in operative connection with said control-mechanism.

5. In a pressure-filter for continuous operation, the combination of a pressure-casing constructed at its under part as an annular liquid trough, with a plurality of filter-plates positioned radially with respect to said casing and mounted circularly rotatable about a control-mechanism arranged centrally with respect to said casing, horizontally positioned joints for swingably supporting said filter-plates to permit additional swinging motion of the latter in a radial plane through an angle of 90°, said joints being constructed hollow and adapted to serve as a drainage means for the filtrate, radially directed partitions within said trough, said partitions dividing the latter into a plurality of working spaces and a collecting space, a lifting disk for successively lifting said filter-plates during circular motion through said casing over said partitions from one into an adjacent space, means for transmitting motion from said lifting disk to said filter-plates, and a device for removing the precipitate from said filter-plates during being lifted within said collecting space, after passage through said working spaces.

6. In a pressure-filter for continuous operation, the combination of a pressure-casing constructed at its under part as an annular liquid trough, with drainage means for the filtrate, a plurality of filter-plates positioned radially with respect to said casing and mounted rotatably in horizontal direction about a control-mechanism arranged centrally with respect to said casing, joints for swingably supporting said filter-plates to permit additional swinging motion thereof in radial planes through an angle of 90°, radially directed partitions within said trough, said partitions dividing the latter into a plurality of working spaces and a collecting space, one of said working spaces being further subdivided into individual spaces adapted to serve as washing spaces, a lifting disk for successively lifting and lowering said filter-plates in circular motion through said casing over said partitions from one into another of said spaces, means for transmitting motion from said lifting disk to said filter-plates, said joints, and therewith said filter-plates, as well as said lifting disk being operatively connected to said control-mechanism to be automatically actuated thereby.

7. In a pressure-filter for continuous operation, the combination of a pressure-casing constructed at its under part as an annular liquid trough, with drainage means for the filtrate, a plurality of filter-plates mounted circularly rotatable about a control-mechanism arranged centrally with respect to said casing, joints for supporting said filter-plates to permit additional swinging motion of the latter in radial planes through an angle of 90°, radially directed partitions within said trough dividing the latter into a plurality of working spaces and a collecting space, lifting and lowering means adapted to move said plates in succession over said partitions from one into another of said spaces, and a single horizontally positioned knife-mechanism cooperative with and common to all filter-plates and composed of two individual knives positioned obliquely with respect to the surfaces of said filter-plates, said knife mechanism adapted to remove the precipitate successively from said plates when passing therethrough in upward direction within said collecting space, said joints and filter-plates and said lifting and lowering means being operatively connected with said control-mechanism to be positively and automatically actuated by the latter.

8. In a pressure-filter for continuous operation, the combination of a pressure-casing constructed at its under part as an annular liquid trough, with drainage means for the filtrate, a plurality of filter-plates mounted circularly rotatable about a control-mechanism arranged centrally with respect to said casing, joints for supporting said filter-plates to permit additional swinging motion of the latter in radial planes through an angle of 90°, radially directed partitions within said trough dividing the latter into a plurality of working spaces and a collecting space, lifting and lowering means adapted to move said plates in succession over said partitions from one into another of said spaces, and a single horizontally positioned knife-mechanism cooperative with and common to all filter-plates and composed of two individual knives positioned obliquely with respect to said filter-plates, one of said individual knives being associated with a brush swingably mounted on the back of said knife-mechanism, said knives and said brush adapted to remove the precipitate from said plates when passing therethrough in upward and downward direction, respectively, said joints and filter-plates and said lifting and lowering means being operatively connected with said control-mechanism.

9. In a pressure-filter for continuous operation, the combination of a pressure-casing constructed at its under part as an annular liquid trough, with drainage means for the filtrate, a plurality of filter-plates mounted circularly rotatable about a control-mechanism arranged centrally with respect to said casing, joints for supporting said filter-plates to permit additional swinging motion of the latter in radial planes through an angle of 90°, radially directed partitions within said trough dividing the latter into a plurality of working spaces and a collecting space, lifting and lowering means adapted to move said plates in succession over said partitions from one into another of said spaces, and a double knife adapted to remove the precipitate from said filter-plates when passing upwards therethrough, a carrier for said double knife, said carrier being mounted movably and adapted to participate in the circular motion of a filter-plate at a time treated by said knife, rollers, guide means and a spring adapted to move said carrier automatically into its initial inoperative position in released condition of said knife, said joints and filter-plates and said lifting and lowering means being operatively connected with said control-mechanism.

10. In a filter of the character described, the combination of a filter-casing, with a plurality of radially directed partitions dividing said casing into a plurality of working spaces and a collecting space, filter-plates mounted swingably in radial direction with respect to said casing, driving means for imparting successive circular and upward and downward swinging motions to said filter-plates to move successively through said spaces, said driving means including a lifting disk and means for transmitting motion from said disk to said filter-plates to lift and lower said plates in succession from one into another of said spaces, a bevel-gear drive mounted outside of said filter-casing, said bevel-gear drive adapted to raise and lower said disk, and a reversing gear interposed between said disk and said bevel-gear drive, and drainage means for the filtrate.

11. In a filter of the character described, the combination of a filter-casing, with a plurality of radially directed partitions dividing said casing into a plurality of working spaces and a collecting space, filter-plates mounted swingably in radial direction with respect to said casing, driving means for imparting successive circular and upward and downward swinging motions to said filter-plates to move successively through said spaces, said driving means including joints for swingably supporting said filter-plates, said joints being adapted as drainage means for the filtrate, a hollow extension on each of said filter-plates, a prismatic pivot fast on each of said joints and adapted to form a support for said extensions and therewith for said filter-plates to permit easy disengagement of said plates from said joints and removal of the former from the filter-casing.

12. In a filter of the character described, the combination of a filter-casing, with a plurality of radially directed partitions dividing said casing into a plurality of working spaces and a collecting space, filter-plates mounted swingably in radial direction with respect to said casing, driving means for imparting successive circular and upward and downward swinging motions to said filter-plates to move successively through said spaces, said driving means including horizontally positioned joints for swingably supporting said filter-plates to permit swinging motion of the latter in radial planes through an angle of 90°, said joints being constructed hollow and adapted to serve as a drainage means for the filtrate.

13. In a pressure-filter for continuous operation, the combination of a pressure-casing constructed at its under-part as an annular liquid trough, with drainage means for the filtrate, a plurality of filter-plates mounted circularly rotatable about a control-mechanism arranged centrally with respect to said casing, joints for supporting said filter-plates to permit additional swinging motion of the latter in radial planes through an angle of 90°, radially directed partitions within said trough dividing the latter into a plurality of working spaces and a collecting space, lifting and lowering means adapted to move said plates in succession over said partitions from one into another of said spaces, a horizontally positioned knife-mechanism comprising two individual knives positioned obliquely with respect to the surfaces of said filter-plates, said knife-mechanism adapted to remove the precipitate from said plates when swinging therethrough.

14. In a pressure-filter for continuous operation, the combination of a pressure-casing constructed at its under part as an annular liquid trough, with drainage means for the filtrate, a plurality of filter-plates mounted circularly rotatable about a control-mechanism arranged centrally with respect to said casing, joints for supporting said filter-plates to permit additional swinging motion of the latter in radial planes through an angle of 90°, radially directed partitions within said trough dividing the latter into a plurality of working spaces and a collecting space, lifting and lowering means adapted to move said plates in succession over said partitions from one into another of said spaces, a horizontally positioned knife-mechanism comprising two individual knives positioned obliquely with respect to said filter-plates, one of said individual knives being associated with a brush rotatably mounted on the back of said knife, said knives and said brush adapted to remove the precipitate from said plates when swinging therethrough.

15. In a pressure-filter for continuous operation, the combination of a pressure-casing constructed at its under part as an annular liquid trough, with drainage means for the filtrate, a plurality of filter-plates mounted circularly rotatable about a control-mechanism arranged centrally with respect to said casing, joints for supporting said filter-plates to permit additional swinging motion of the latter in radial planes through an angle of 90°, radially directed partitions within said trough dividing the latter into a plurality of working spaces and a collecting space, lifting and lowering means adapted to move said plates in succession over said partitions from one into another of said spaces, a double knife adapted to remove the precipitate from said plates when swinging therethrough, a carrier interposed between said filter-plates and said double knife to permit motion of the latter with said filter-plates, rollers, guide means and a spring adapted to move said carrier and said knife back into inoperative position.

FRITZ JAEGER.